United States Patent [19]

Hohloch et al.

[11] Patent Number: 4,825,705

[45] Date of Patent: May 2, 1989

[54] MASS FLOW METER WITH EQUIPMENT FOR DETERMINATION OF THE CORIOLIS FORCE

[75] Inventors: Manfred Hohloch, Auenwald, Fed. Rep. of Germany; Stephen Owen, Royston, United Kingdom; Walter Steffen, Pliezhausen; Wolfgang Stumm, Reutlingen, both of Fed. Rep. of Germany

[73] Assignee: Rheometron AG, Basel, Switzerland

[21] Appl. No.: 79,755

[22] Filed: Jul. 30, 1987

[51] Int. Cl.[4] .................... G01F 1/84

[52] U.S. Cl. .................... 73/861.38

[58] Field of Search .......... 73/861.37, 861.38, 272 R

[56] References Cited

U.S. PATENT DOCUMENTS 4,660,421 4/1987 Dahlin et al. .................... 73/861.38

*Primary Examiner*—Herbert Goldstein

*Attorney, Agent, or Firm*—Nutter, McClennen & Fish

[57] ABSTRACT

A mass flow meter for flowing media with equipment for determining the coriolis force consists of a helicoidally bent measuring tube provided with two tube loops whose inflow and outflow ends are fastened to a massive cast block and between whose oppositely pivotable tube loops are arranged an oscillator and two sensors measuring the torsional oscillations. For a more compact stiffening and an improved clamping of the measuring tube at the cast block, the two tube loops are in each case ovally bent in one plane, extend approximately parallel to one another and are provided on one longitudinal side in each case with two tube sections lying opposite to one another in an alignment line ($x_1$—$x_1$ or $x_2$—$x_2$). Of these sections, two are crosswise connected through a central tube part extending between the two loops and the two other tube sections are joined to the tube inflow and outflow ends which extend in opposite directions in a curved shape between the two tube loops and which run coaxially to the longitudinal sides to the outside. The tube loops are clamped and welded to the cast block in the area of these four tube sections.

5 Claims, 5 Drawing Sheets

1
2 (3)
4
5
6
7
9
10
13 (14)
15
16(8)
17
18
18
19

1
2
4
5
6
7
8
9
10
13
14
15
16
20
21
22
23
24
26
27

2
3
4
5
6
7
9
10
11
12
13
14
16
17
18
20
21
23
24

MASS FLOW METER WITH EQUIPMENT FOR DETERMINATION OF THE CORIOLIS FORCE

The invention relates to a mass flow meter for flowing media with equipment for determination of the coriolis force, which consists of a helicoidally-bent measuring tube, provided with two tube loops, whose inflow and outflow ends are affixed to a massive cast block and between whose opposedly pivotable tube loops are arranged an oscillator and two sensors measuring torsional oscillations of the loops.

BACKGROUND OF THE INVENTION

A mass flow meter of this general type is known, for example, from the WO No. 85/05677. In that prior meter design, the measuring tube (shown in FIG. 4 of that publication) consists of a uniformly bent tube-piece which is helicoidally bent so that the two tube loops extend in a spiral path. The inflow and outflow ends of the tube are guided from the outside tube windings tangentially in opposite directions and are bent outside of the tube loops into a joint axle center where also takes place the mounting or clamping of the tubes on bearing blocks. This fastening results, to be sure, in a relatively favorable, almost exclusively torsional, stress at the two clamping sites. However, the great distance between the clamping sites requires a considerable mechanical expenditure for a stiffening device that exludes as much as possible external vibration effects. Such mechanical stiffening devices also require much space.

European Patent Application No. 86 200 575.8 describes a mass flow meter in which two ovally-bent tube loops, arranged approximately parallel to one another, as well as an inflow and outflow tube are welded to a connecting block provided with flow channels. This construction has, however, the drawback that the measuring tube is subdivided into four tube sections which have to be welded to the connecting block in an involved manner. These welding connections of the bent tube loops are weakened by the deformation forces arising upon oscillation of the tubes; indeed, in some cases, the connections can be destroyed. Furthermore, cracks or grooves caused by the welding can exclude that type of flow meter from certain application fields, e.g. for the food industry.

SUMMARY OF THE INVENTION

In contrast, this invention has the object to stiffen a mass flow meter with a continuous measuring tube of the generic type in a compact manner and to clamp-in the measuring tube at sites that are favorable for the vibrations of interest. This objective is achieved by the invention in that the two tube loops of the flow meter are each always ovally bent in one plane, they extend approximately parallel to one another and they are always provided on a longitudinal side with two tube sections each lying opposite to one another in alignment. Also, of the four tube sections, two tube sections are connected crosswise by a curved central tube section or part which extends between the two loops, and the two other tube sections are joined to the inflow and outflow ends of the tube. Still further, these ends are guided in the shape of a curve in two opposite directions to the outside between the two tube loops and coaxially to the longitudinal sides, and the tube loops are clamped in a cast block and welded-on in the area of these four tube sections.

This new design of the measuring tube to pass through the flow meter without any interruption produces a definite advantage in that the meter is especially compact. Also, the two tube loops have a particularly favorable form for the generation of mechanical oscillations and the measurement of the twistings caused by coriolis forces. Further, since the tube loops are clamped and welded to continuous sections of the measuring tube there are avoided the above-described destructive forces on the welding seams. Finally, the measuring tube of the present flow meter is so favorably bent that the central tube section which connects the two tube loops and the deflected tube sections which lead to the inflow and outflow ends of the tube lie within the space encompassed by the two tube loops.

A particularly favorable assemblage of the equipment can be achieved in that the measuring tube may consist of two uniform, generally hook-shaped bent tube parts which extend from the inflow and outflow ends of the tube up to the center of the pivotable longitudinal side of the respective tube loop and to which is welded the central tube section. This construction permits, for the first time, the relatively easy manufacture and installation of a measuring tube which is complicated, yet still compact in its design. For manufacture, there are required only three tube parts, of which two tube parts are identical. These three tube parts are connected to form a continuous uniform measuring tube by orbital welding which can produce gap-free welding seams. The two orbital weld seams are favorably located at sites on the measuring tube at which arises the lowest mechanical strain, but which are also symmetrical to the clamping sites. For protection, the two orbital welding seams may also be covered permanently by a ring welded to the measuring tube and to which can be affixed the oscillator component of the flow meter.

The cast block which serves for stiffening and clamping consists preferably of a base plate, which lies within the oval tube loops and intersects their planes, and a cover plate which has half shells enclosing the measuring tube at the four tube sections, and which are welded to these tube sections, as well as to one another. This design allows a simple mounting of the equipment. For this, the cast block is inserted in the measuring tube and positioned so that the tube sections lie in the half shells. Then, the cover plate is laid on and welded in place. As support for the inflow and outflow ends of the tube, the base plate is provided with correspondingly arranged supporting webs and half shells and is welded to tube ends. After such assembly, the flow meter with its inflow and outflow ends, which ends may be provided, for example, with mounting flanges, is ready to be installed into a pipe line through which flows the medium that is to be measured.

BRIEF DESCRIPTION OF THE DRAWINGS

The subject matter of the invention is illustrated in the drawing in an exemplified embodiment, wherein.

DESCRIPTION OF THE PREFERRED EMBODIMENT

Figure 1:
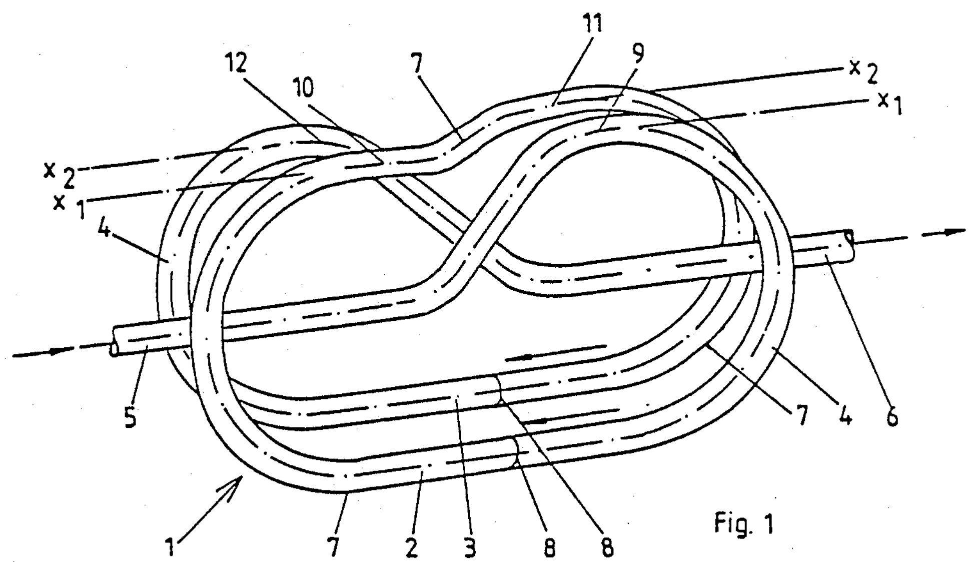
FIG. 1 is the measuring tube of a mass flow meter shown in perspective and diagrammatically.

The measuring tube 1, shown in FIG. 1 in a simplified manner, consists of a continuous uniform tube usually made of a corrosive-resistant material, e.g. stainless steel, through which flows the medium which is to be measured. The tube is helicoidally bent so that there are formed two tube loops 2 and 3 which are always ovally bent in a parallel plane/s and which are spaced apart approximately parallel to one another (See also FIG. 4).

As the measuring tube 1 presents sort of a knot, it is assembled out of three tube parts which are gap-free-welded at their joint abutments according to the so-called butt-weld-orbital-method to form the continuous uniform measuring tube 1. The three tube parts consist of two identical, hook-like bent tube parts 4. One of these, a frontal hook-like bent tube part 4 shown in FIG. 4, forms the inflow end 5 of the measuring tube 1 and extends over the right deflection by 180 degrees up to the center of the lower longitudinal side of the frontal tube loop 2; the other of these, a rear hook-like bent tube part 4 forms, in like manner, the outflow end 6 of tube 1 and extends over the left deflection by 180 degrees up to the center of the lower longitudinal side of the rear tube loop 3. The associated third tube part 7 is shaped generally like a non-planar letter C i.e. a twisted C, and, on the one hand, forms the other half of the respective tube loop 2 or 3 and, on the other hand, connects cross-wise both tube loops 2 and 3.

The welding-together of the three tube parts 4, 7 and 4 is done at two lower joint abutments where the two orbital weld seams 8 are indicated in FIG. 1. From FIG. 1 is seen also that the middle portion of the central tube part 7 lies at the same height as the tube sections 9 to 12, proceeding at the top longitudinal sides of the tube loops 2 and 3 along the alignment lines $x_1$—$x_1$ or $x_2$—$x_2$. The tube inflow and outflow ends 5, 6, on the other hand, are bent in opposite directions obliquely inward into the space between the two tube loops 2,3 and they extend from there between both tube loops 2,3 out beyond the front end of the measuring tube 1. The tube segments 9, 10 or 11, 12 lying opposite to one another in the alignment lines $x_1$—$x_1$ or $x_2$—$x_2$ comprise the clamp-in sites at which the measuring tube 1 is clamped and fastened in a cast block 13 as shown in FIG. 2.

Figure 2:
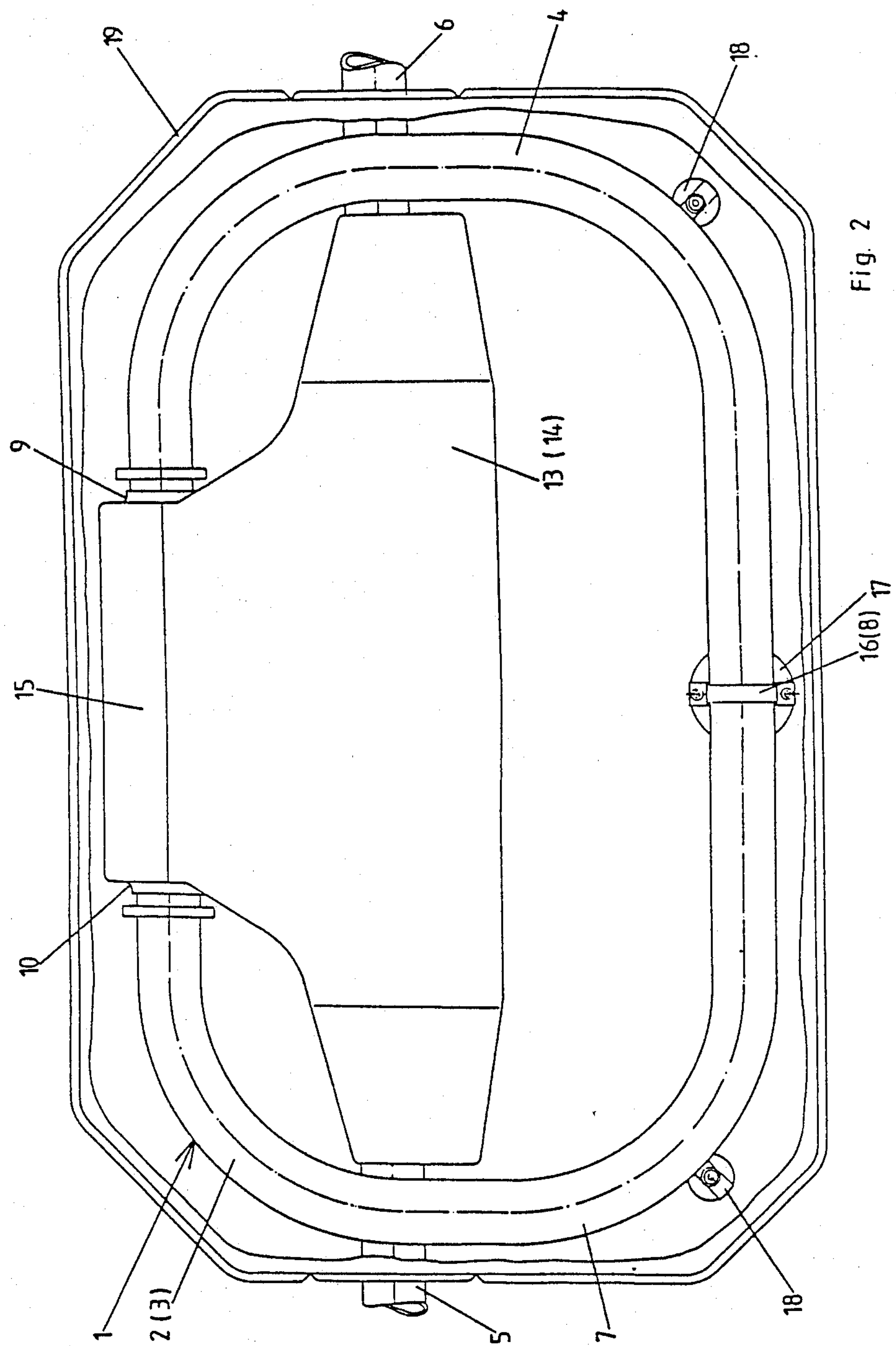
FIG. 2 is a mass flow meter shown in a lateral view.

FIG. 2 shows that the tube sections 9, 10 extend out at the head of the cast block 13 and run downward around the cast block 13 and form thereby the pivotal oval tube loop 2. Approximately parallel thereto lies the other identically-designed tube loop 3 (see FIGS. 4 and 5).

Figure 4:
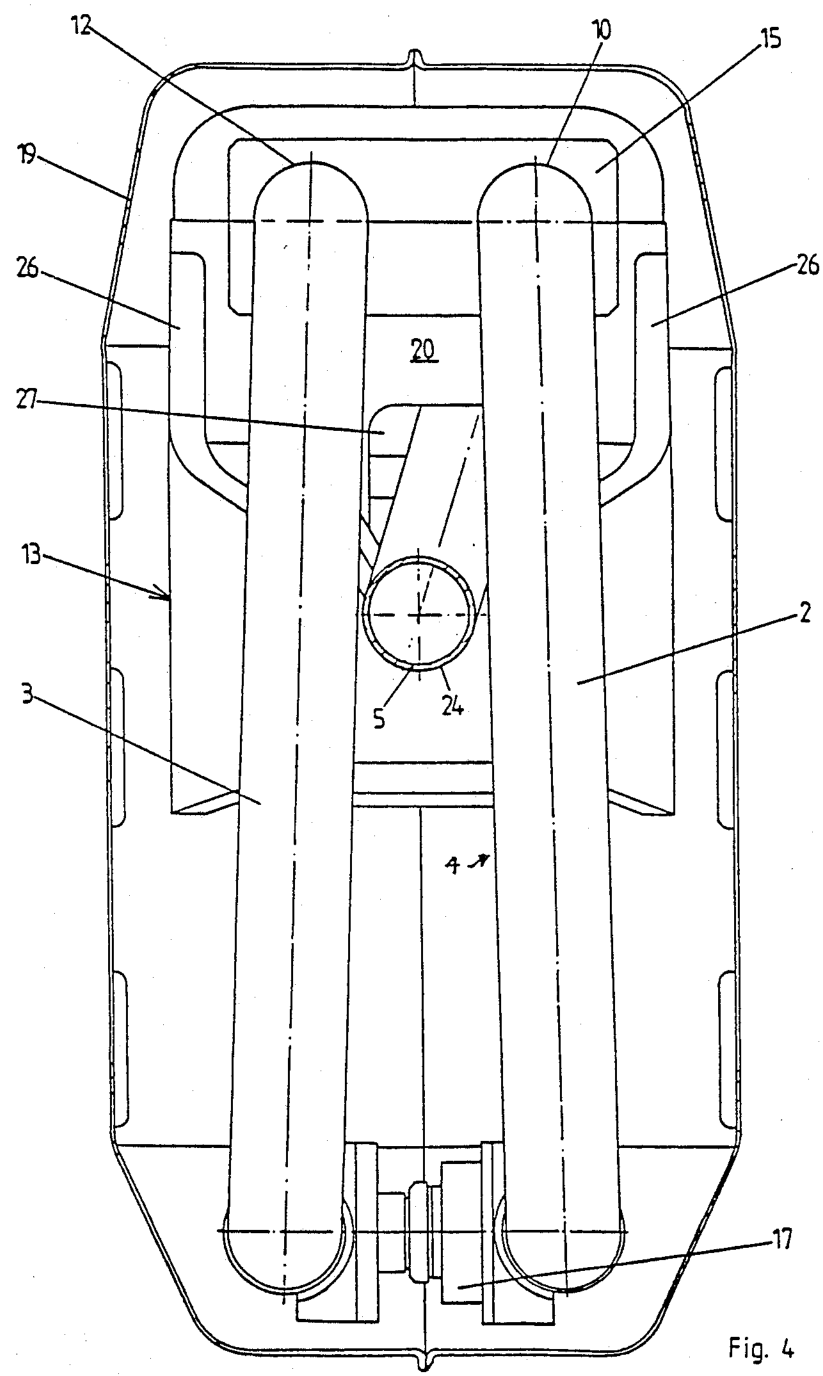
FIG. 4 is the FIG. 2 flow meter viewed from the front.
Figures 5, 7:
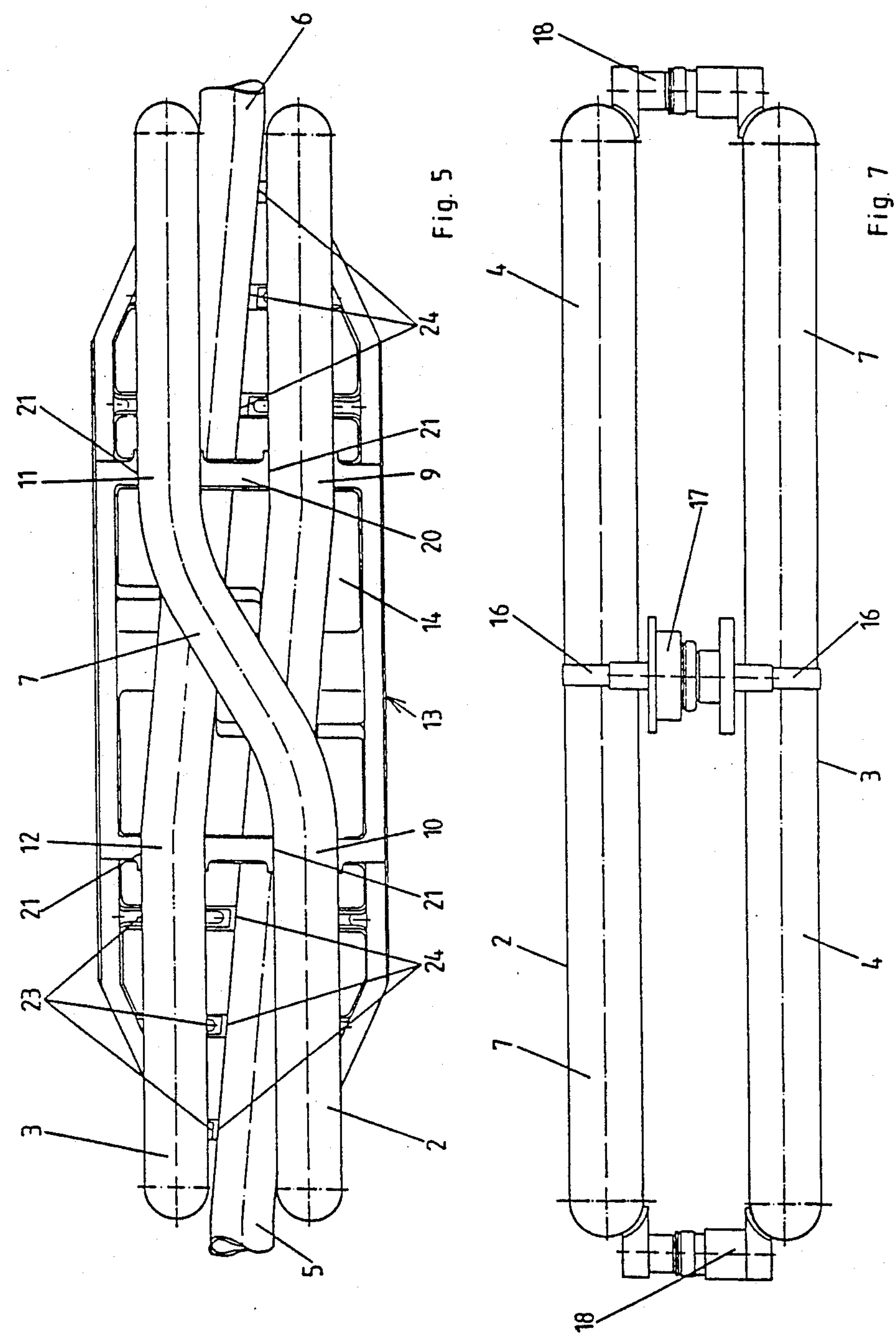
FIG. 5 is the FIG. 2 flow meter showing a top view of the measuring tube and of the cast block, without the cover plate.
FIG. 7 shows a section of the FIG. 2 flow meter in a view from the bottom, with the oscillator and the sensors.

The cast block 13 comprises a base plate 14 and a cover plate 15, both of these parts being massive cast pieces. FIG. 2 shows further that the two orbital weld seams 8 are each covered by a welded-on ring 16 which also serves as a fastening member for a magnetic oscillator 17. The oscillator is arranged between the two tube loops 2, 3 and sets the loops into opposite oscillations (see FIGS. 4 and 7). FIG. 2 in connection with FIG. 7 shows also two sensors 18 which are arranged at the sides between the tube loops 2,3 and which pick up the torsions of the tube loops 2, 3 caused by coriolis forces. Finally, as shown in FIGS. 2 and 4, the mass flow meter comprising the measuring tube 1 and the cast block 13 is equipped with a casing 19 consisting of two half shells.

Figure 6:
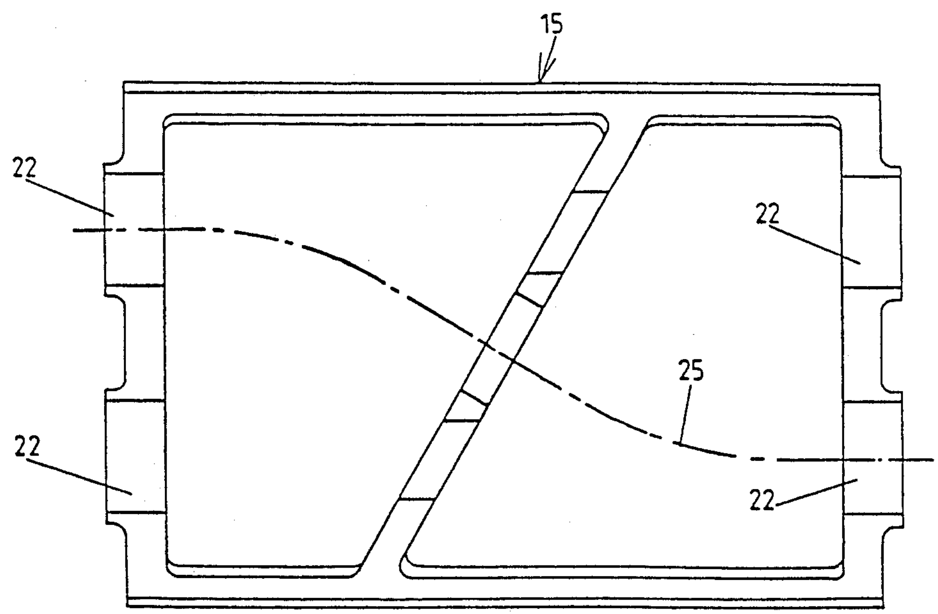
FIG. 6 shows the bottom surface of a cover plate for the cast block depicted in FIG. 5.
Figure 3:
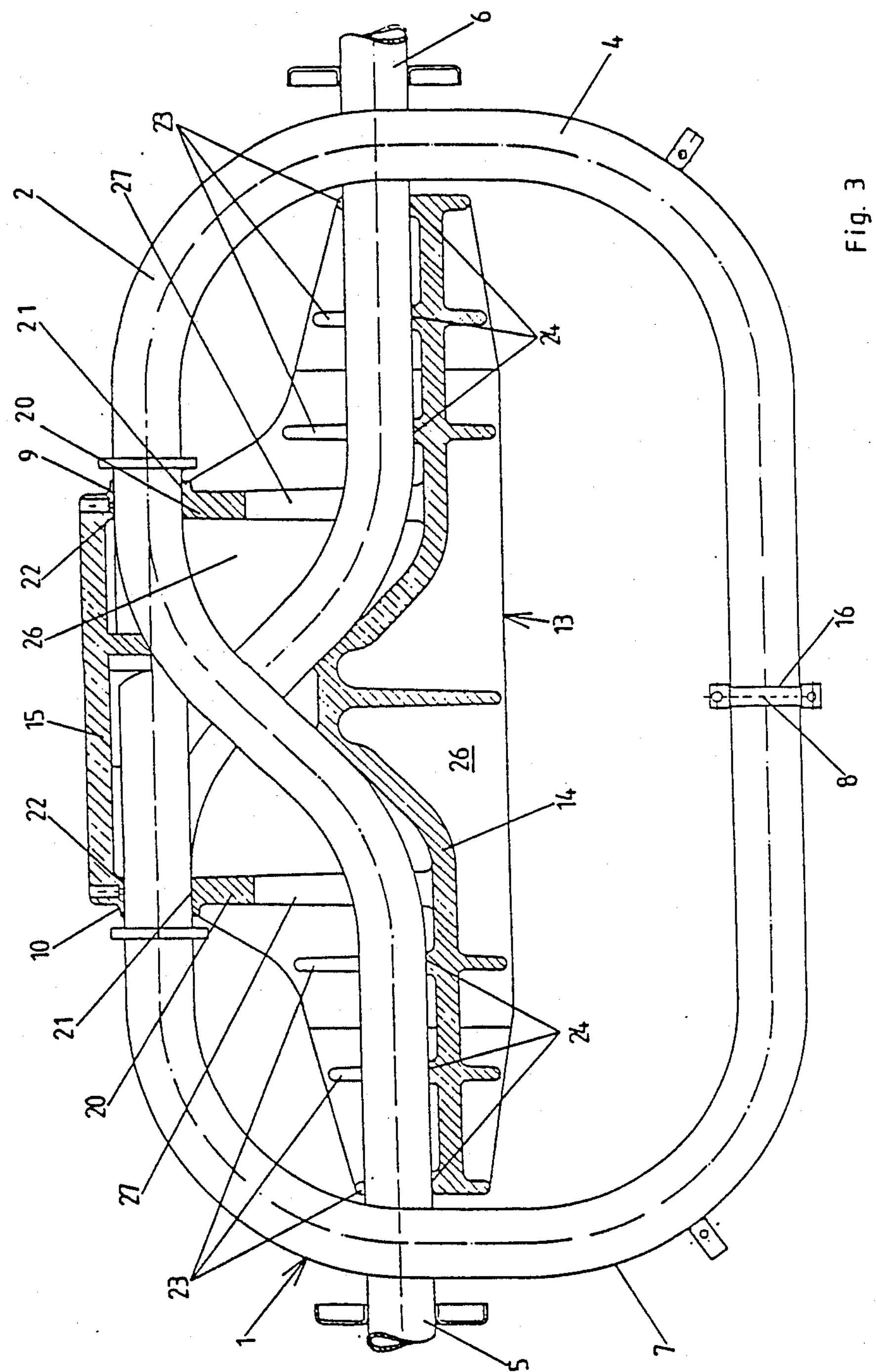
FIG. 3 is the FIG. 2 flow meter without its casing shown in a central longitudinal section.

For the clamping and bracing of the measuring tube 1 at the cast block 13, the base plate 14 and the cover plate 15 is provided with suitable bearing parts. From FIGS. 3 to 5, it can be seen that the base plate 14 is provided with sidewalls 26 between which are provided for support of the aforementioned tube sections 9 to 12, two support webs 20 which have half shells 21 into which fits, in each case, a tube section 9 to 12. In a corresponding manner also, the cover plate 15 shown in FIG. 6 is provided with half shells 22 so that tube sections 9 to 12 are enclosed and clamped at their circumferences by the half shells 21, 22. For this purpose, the tube sections 9 to 12 are welded to the half shells 21, 22. Likewise, the cover plate 15 is welded to the box-shaped upper rim of the base plate 14. The two supporting webs 20 have cutouts 27 through project the inflow or outflow end 5 or 6 of the tube. The course of the central tube part 7 is indicated in FIG. 6 by the associated centerline 25. Further, there are cast onto the base plate 14 supporting webs 23 provided with half shells 24 upon which rest and are welded-on the tube inflow and outflow ends 5,6.

What is claimed as new and desired to be secured by Letters Patent of the United States is:

1. A mass flow meter for flowing media with equipment for determination of the coriolis force, comprising a helicoidally bent measuring tube (1) provided with two tube loops (2,3), whose inflow and outflow ends (5,6) are affixed to a block (13) and between which tube loops (2,3) are arranged an oscillator (17) and two sensors (18), characterized in that, the two tube loops (2,3) are each ovally bent in one plane, and the loops extend approximately parallel to one another and each loop is provided with two tube sections (9, 10 or 11, 12) lying opposite to one another in an alignment line ($x_1$—$x_1$ or $x_2$—$x_2$) of which two sections (10, 11) are crosswise connected through a curved central tube section (7) that extends between the loops and the two other tube sections (9, 12) join to the tube inflow and outflow ends (5, 6), which extends in opposite directions in a curved shape between the two tube loops (2, 3) and which extend along substantially the same axis beyond the loops and that the tube loops (2, 3) are anchored to the block 13 in the area of the four tube sections (9 to 12).

2. The mass flow meter according to claim 1, characterized in that, the measuring tube (1) consists of two uniform, generally hook-like bent tube parts (4), which extend from the tube inflow and outflow ends (5, 6) up to the middle of the respective tube loop (2, 3) and to which is connected by two connections (8) the central tube section (7).

3. The mass flow meter according to claim 2, characterized in that, the two connections (8) are orbital welding seams each of which is covered by a ring (16) welded onto the measuring tube (1), to which ring is fastened the oscillator (17).

4. The mass flow meter according to any one of the claims 1 to 3, characterized in that, the block (13) consists of a base plate (14) lying within the oval tube loops (2, 3) and the base plate (14) intersecting their planes and a cover plate (15) which has half shells (21, 22) enclosing the measuring tube (1) at the four tube sections (9 to 12) and which are welded to these tube sections (9 to 12) as well as to one another.

5. The mass flow meter according to claim 4, characterized in that, the base plate (14) is provided with support webs (22) an half shells (24) and is welded together with them.

* * * * *